Aug. 14, 1956     H. COENDERS     2,758,888
CHAIN TRACK VEHICLE IN WHICH SPECIAL SHOES
ARE FITTED ON THE TRACK CHAINS
Filed Dec. 9, 1953                3 Sheets-Sheet 1
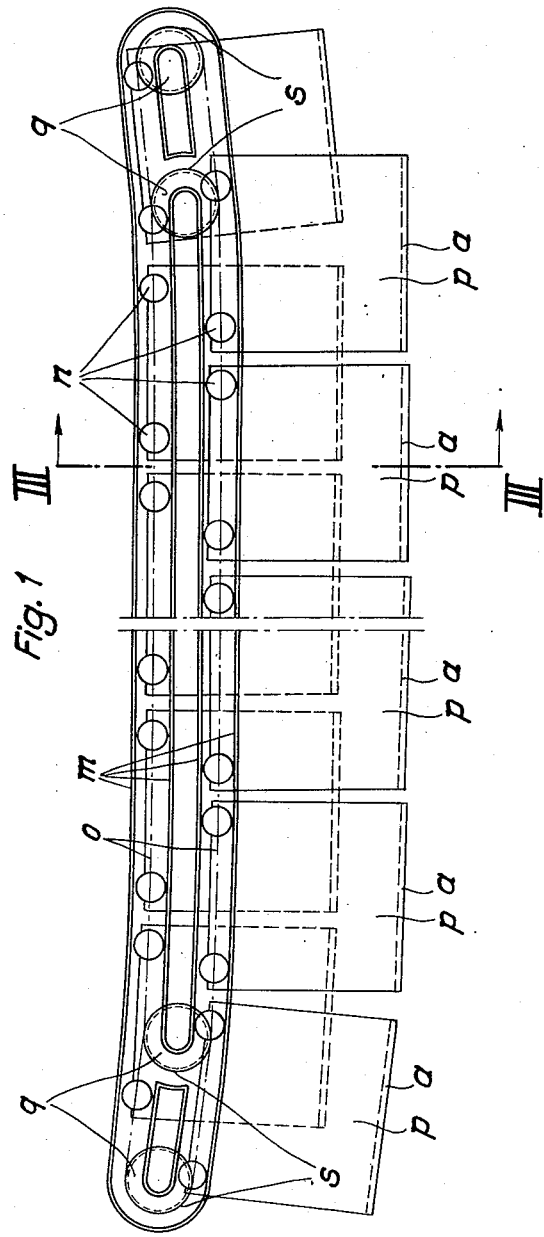
Inventor:
HANS COENDERS
By Bryant + Loury
ATTORNEYS

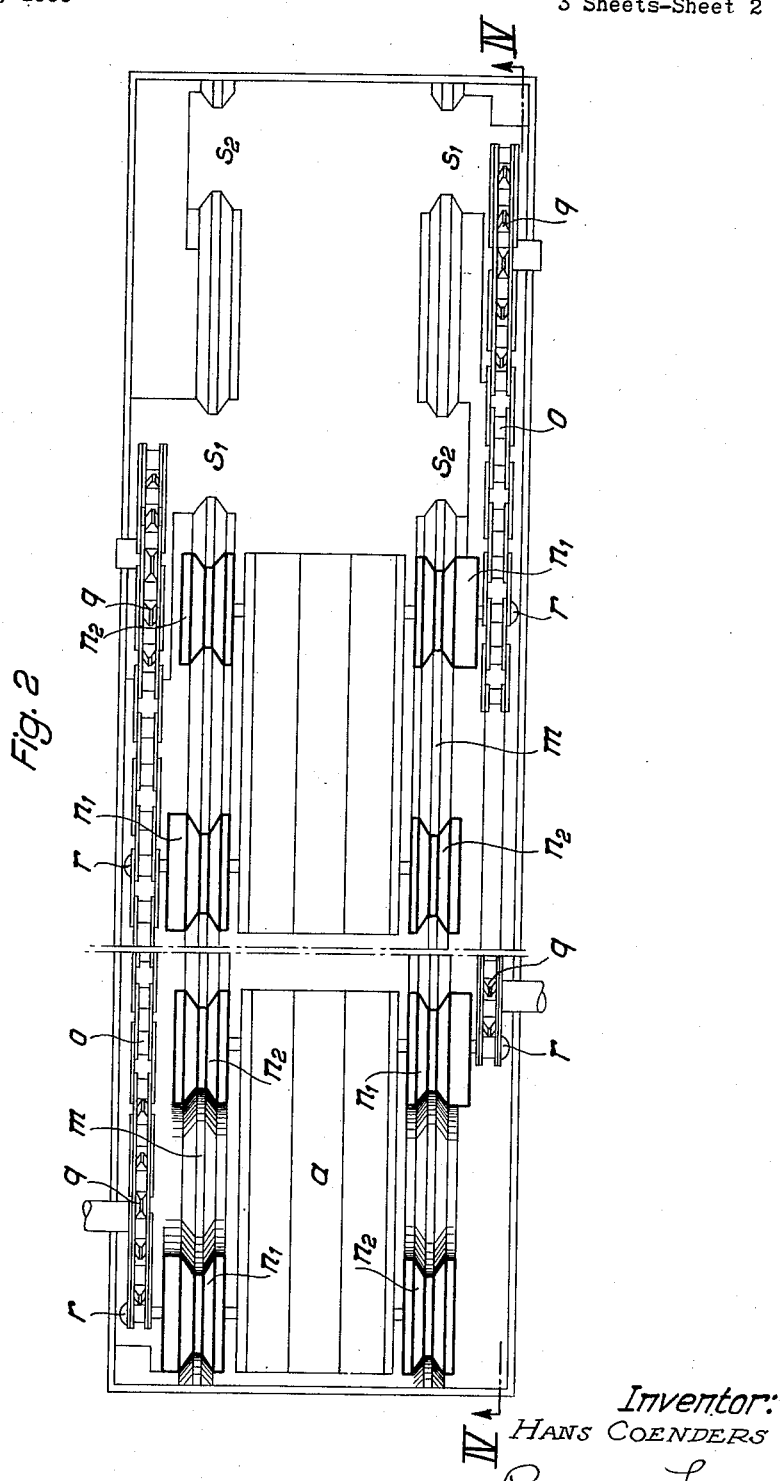

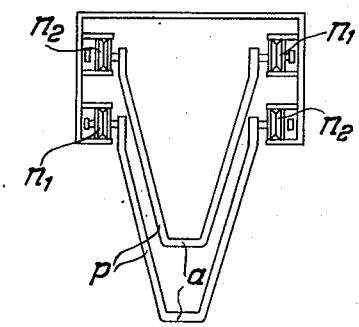
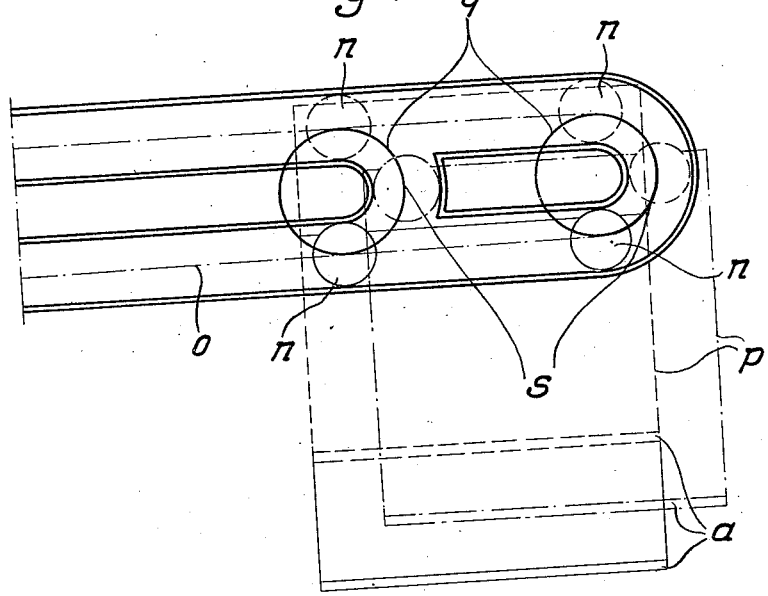

United States Patent Office 2,758,888
Patented Aug. 14, 1956

2,758,888

CHAIN TRACK VEHICLE IN WHICH SPECIAL SHOES ARE FITTED ON THE TRACK CHAINS

Hans Coenders, Krefeld-Traar, Germany

Application December 9, 1953, Serial No. 397,155

Claims priority, application Germany December 15, 1952

5 Claims. (Cl. 305—4)

This invention relates to chain track vehicles, and more particularly to a cross-country chain track vehicle intended particularly for agriculture and forestry, which is characterized by its low build, low center of gravity and therefore small tipping moment, narrow track width, large bearing surface or base, light weight and low power requirement. Owing to its constructional characteristics, fouling of the running parts by earth falling off the shoes when they are carrying out their return travel is avoided.

It is an object of the invention to provide a chain track vehicle comprising continuous track chains with upper and lower sections, a plurality of runner shoes carried by said chains, each shoe having a tread, and a continuous track guiding said shoes so that they are always shifted by said chains and are always parallel within themselves, said shoes being of such height that the treads are always below the lower track path.

According to another object of the invention the shoes have at their upper end two diagonally opposite wide and narrow rollers which are guided to gauge in tracks running radially and parallel. Each of the wide rollers is connected with a chain for effecting the drive. To ensure that the shoes always remain parallel also at the reversing points of the track, the wheels for driving and guiding the chains are also diagonally opposite, the tracks have each diagonally opposite wide and narrow passages for the wide and narrow rollers and the tracks are also guided radially and parallel through the passages.

Further objects and advantages of the present invention will be apparent from the following description, reference being had to the accompanying drawings wherein a preferred embodiment of the present invention is clearly shown.

In the drawings, in which like characters of reference designate like parts throughout the several views thereof:

Fig. 1 shows a chain track vehicle in side elevation with side wall removed;

Fig. 2 is a top plan view with the upper guide rails removed;

Fig. 3 is a section on line III—III of Fig. 1; and

Fig. 4 is a section on line IV—IV of Fig. 2.

As can be seen from the drawings the chain track vehicle according to the invention in its fundamental form of construction has on each side two parallel and radial endless double tracks $m$, two chains $o$ driven by sprocket wheels $q$ and, according to the size of the vehicle, a number of runner shoes $p$ with bearing surfaces or treads $a$ and rollers $n$ at the upper end of each shoe. Of these rollers two wide rollers $n_1$ and two narrow rollers $n_2$ lie diametrically opposite each other. At the front and rear reversal points of the double track there are on each side a wide passage $s_1$ for the wide rollers $n_1$ and a narrow passage $s_2$ for the narrow rollers $n_2$. The chains $o$ are only connected to the runner shoes $p$ through the intermediary of the diagonally opposite wide rollers $n_1$, namely by means of carrier bolts $r$ mounted in the tubular chain bolts and pivoted on the runner shoes $p$.

When the chains $o$ are driven, the runner shoes $p$ are positively carried along by the chains. As the rollers $n_1$ and $n_2$ are on all sides guided to gauge between the tracks $m$, the runner shoes $p$ and therefore the bearing surfaces or treads $a$ thereof can only carry out parallel and radial movements serving for propulsion and determined by the double track $m$. Incidental and unnecessary independent movements not serving for propulsion, and also any counter-running of the rollers, which means loss of power, are impossible. At the reversal points of the tracks $m$ where the chains $o$ carry out a change in direction in running over the sprocket wheels $q$, the bearing surfaces or treads $a$ of the runner shoes $p$ are compelled to carry out a parallel and radial movement owing to the diagonally opposite wide and narrow passages $s_1$ and $s_2$ for the likewise diagonally opposite wide and narrow rollers $n_1$ and $n_2$, the diagonally opposite chain driving and guiding wheels $q$ and to the fact that the chains are only connected to the wide rollers $n_1$, the said parallel and radial movement being determined by the outer and inner track curves in which the rollers are always guided to gauge.

The parallel tracks $m$ are arranged at such a distance apart that each two tracks form a path $s$ in which the rollers $n_1$ and $n_2$ are guided with a slight amount of play excluding the possibility of contrarotation. The difference in height between the lower supporting double track path and the upper return double track path depends upon the size of the sprocket wheels $q$. The size of these sprocket wheels also determines the height at which the bearing surfaces or treads $a$ of the returning shoes $p$ are guided above the lower shoes resting on the ground. As can be seen, particularly from Figs. 1 to 3, the dimensions of the shoes $p$ are so chosen that their treads carry out their return movement below the lower track path. As the track paths are parallel the shoes $p$ guided therein and also the bearing surfaces or treads $a$ are always shifted parallel to themselves.

In Fig. 4 the shoe $p$ is shown in three different positions at a reversal point and, for the sake of clearness, the second sprocket wheel $q$ is also shown although this would not be visible in a side elevation, because it is diagonally opposite the first sprocket wheel $q$, see Fig. 2. The shoe is drawn by the two chains $o$, which in this figure are shown in one plane and which engage the wide rolls, visible in front on the right and at the rear on the left in Fig. 2, simultaneously through both passages $s_1$, the roller $n_1$, visible in front in Fig. 2, being drawn through the passage $s_1$, visible at the bottom on the right, and the rear diagonally opposite roller $n_1$ through the diagonally opposite rear passage $s_1$. Consequently an absolutely uniform parallel displacement takes place, that is all the shoes are carried along in the manner described by the chains through the intermediary of the rollers which at the reversing points also undergo parallel displacement. Fig. 4 shows that the rollers are always guided at the same height in the two track paths and in the chain bolts $r$ also at the reversal points, that is during the reversal movement, so that the shoes $p$ connected with them are also displaced in the same manner with the bearing surfaces or treads $a$.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a chain track vehicle, a pair of laterally spaced parallel double tracks, a plurality of runner shoes each having a substantially V-shaped open frame with the tapered lower end squared off to form a blunt but narrow tread and having a pair of rollers on each side at the upper corners, each of said doube tracks providing continuous parallel guide paths in a vertical plane for the front and rear of each pair of rollers on the corresponding sides of said runner shoes with only a slight clearance to avoid binding, said runner shoes beginning of a depth greater than the distance between the upper and lower guide paths whereby a shoe traveling through the upper guide path will project below the lower guide path, and means for driving said runner shoes around said tracks while continuously maintaining the front and rear rollers of each pair in a horizontal relation.

2. A traction unit for a chain track vehicle comprising a plurality of substantially V-sectioned runner shoes having a pair of rollers at the upper edge corners on each side of the V, a pair of laterally spaced parallel continuous guide track systems for said rollers and driving chain means for maintaining each pair of rollers continuously in a horizontal relation maintaining half the runner shoes moving rearward with respect to said track systems on a lower level in contact with the ground, while the other half moves forward at a higher level suspended within the trough-like space formed in the row of lower runner shoes and extending at all times below the lower level of the track system.

3. A traction unit for a chain track vehicle comprising a plurality of substantially V-sectioned runner shoes having a pair of rollers at the upper edge corners on each side of the V, a pair of laterally spaced parallel continuous guide track systems for said rollers and driving chain means for maintaining each pair of rollers continuously in a horizontal relation maintaining half the runner shoes moving rearward with respect to said track systems on a lower level in contact with the ground, while the other half moves forward at a higher level suspended within the trough-like space formed in the row of lower runner shoes, each track system comprising a pair of opposed parallel narrow rails in a vertical plane forming a continuous guide path having horizontally coextensive sections joined by arcuate end sections, said rails being outwardly widened for a portion of the horizontal sections and extended beyond them a distance equal to the spacing between the front and rear rollers of a runner shoe to form a similar but overlapping guide path for wider rollers having its horizontal sections joined by arcuate end sections, said wider rail paths extending in opposite axial directions on the two sides of said unit to pair off a narrow rail path in one system with a wide rail path in the other system, said rollers on the corresponding diagonal corners of said runner shoes being wider, to follow the wide rail path, said other diagonally positioned rollers being narrow, to match the narrow rails, said driving chain means being connected to drive said wide rollers in their parallel paths simultaneously for each shoe on opposite sides of said unit.

4. A traction unit as defined in claim 3, said wide rollers having an outwardly extending shaft for said drive connection to said chain means.

5. A traction unit for a chain track vehicle comprising a plurality of substantially V-sectioned runner shoes having a pair of rollers at the upper edge corners on each side of the V, a pair of laterally spaced parallel continuous guide track systems for said rollers and driving chain means for maintaining each pair of rollers continuously in a horizontal relation maintaining half the runner shoes moving rearward with respect to said track systems on a lower level in contact with the ground, while the other half moves forward at a higher level suspended within the trough-like space formed in the row of lower runner shoes, the treads of the runner shoes moving forward being at a level below said guide track systems, whereby dirt falling off said shoes will not reach the guide tracks.

References Cited in the file of this patent
UNITED STATES PATENTS

| 1,079,164 | Chenette | Nov. 18, 1913 |

FOREIGN PATENTS

| 251,149 | Germany | Jan. 17, 1912 |
| 885,759 | France | June 7, 1943 |